Patented Mar. 18, 1952

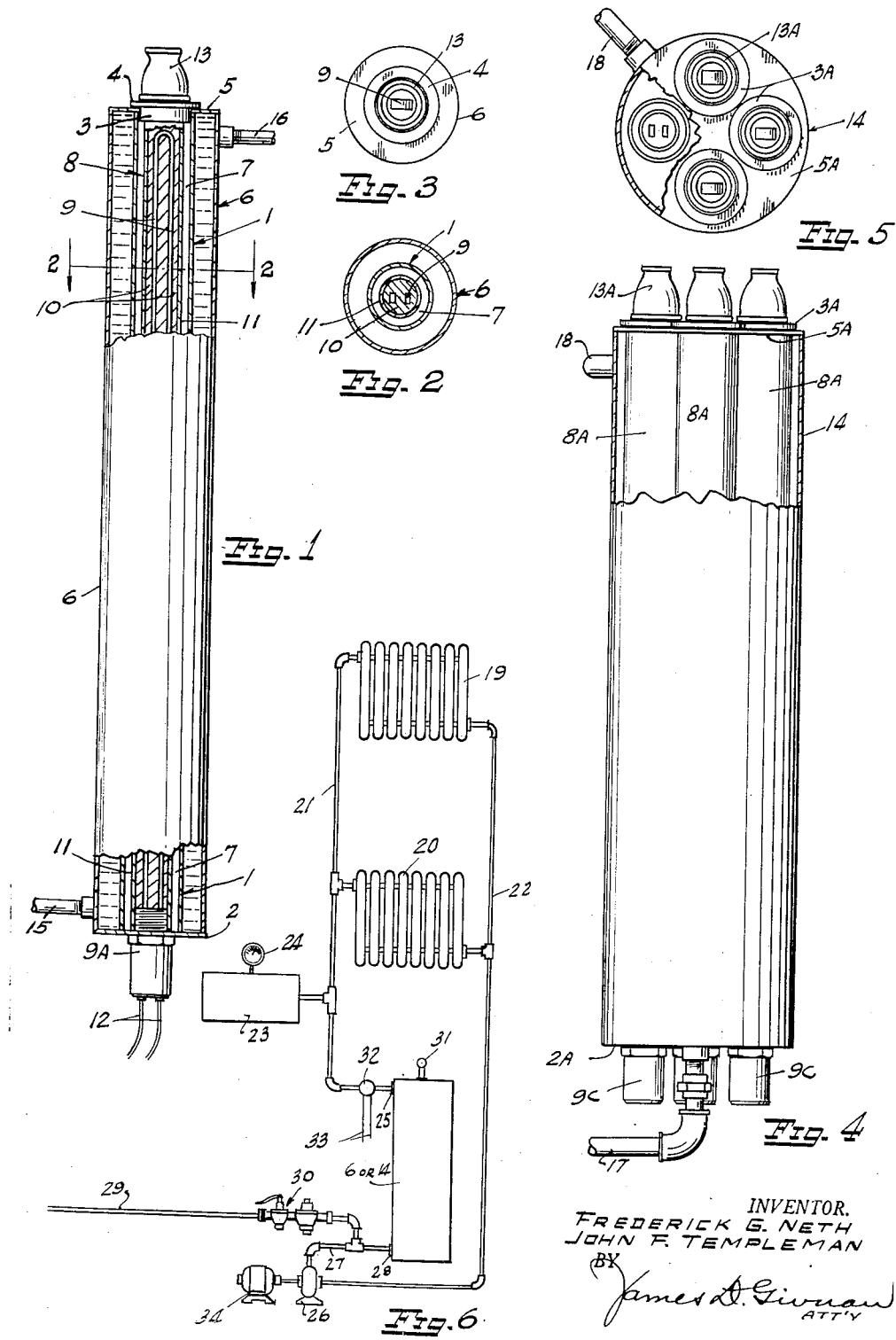

2,589,566

UNITED STATES PATENT OFFICE 2,589,566

ELECTRIC WATER-HEATING SYSTEM

Frederick G. Neth and John F. Templeman, Portland Oreg., assignors to M. F. Keller, Portland, Oreg.

Application December 15, 1949, Serial No. 133,054

2 Claims. (Cl. 219—38)

This invention relates to improvements in electrical water heating apparatus for water heating systems and more particularly to the heating elements used singly or combined within a water tank or boiler.

One of the principal objects of the invention is the provision of water heating apparatus wherein one or more of our electrical heating units are arranged for expeditiously and economically heating water and wherein means is provided for maintaining the water at a predetermined temperature so that there will always be a supply of warm water for instant use.

A further object is the provision of a thermostatic control within the space or area to be heated and an "Aquastat" immersed within the water of the system for maintaining the water at a desired temperature within the system.

A still further object is the provision of a heating element or resistance disposed within a tube and surrounded by molten material such as lead, babbitt, or the like and wherein the tube is concentrically arranged in spaced relation within another tube to form a cylindrical air space between the tubes and also wherein, and in contrast to conventional immersion type heating elements, said element does not come in contact with the water to be heated.

A still further object of the invention is the provision of a unit of this character which may be used singly within a single water tank of a given size or in multiples within a tank or boiler of greater size and capacity.

These and other objects will appear as our invention is more fully hereinafter described in the following specification, illustrated in the accompanying drawings and finally pointed out in the appended claims.

In the drawing:

Figure 1 is a side elevation of a water tank and one of our units disposed therein, and both shown partially in section for convenience of illustration.

Figure 2 is a sectional top plan view of Figure 1 taken approximately along the line 2—2 of Figure 1.

Figure 3 is a top plan view of Figure 1.

Figure 4 is a side elevation of a water tank or boiler showing a plurality of our heating units disposed therein and with a fragment of the tank broken away for convenience of illustration.

Figure 5 is a top plan view of Figure 4 with a fragment of the top broken away.

Figure 6 is a diagrammatic layout of a hot water circulating system in operative connection with either form of water tank made in accordance with our invention.

Referring now more particularly to the drawing:

With particular reference to Figure 1, reference numeral 1 indicates an elongated hollow tube or cylinder closed at its bottom end by a plate 2 and open at its top end through a collar 3 flanged as at 4 to bear against a top end wall 5 which is welded to the top end of a water tank or boiler generally indicated at 6 to seal the same. The water in the tank is confined to the space between the cylinder 1 and the walls of the tank 6. Concentrically disposed within the cylinder 1 and of less diameter than said cylinder, to provide an annular air space 7, is our new and improved heating unit generally indicated at 8 and which comprises a heating element, such for instance as a "Chromalox" heating element, indicated at 9 and imbedded throughout its length in molten material 10 such as lead or the like contained within a tube 11 disposed within, and concentrically disposed with respect to, the cylinder 1 to form the air space 7 as aforesaid. The heating element is doubled back on itself as shown and terminates in a threaded base plug 9A which is secured within the bottom end of the tube 11 to seal off the same. The two ends of the heating element are connected with wires 12 for connection with a source of electrical energy to be hereinafter described.

The bottom end wall 2 of the tank 6 has an opening therein through which the base plug 9A extends to bear against the plate 2 for securing the heating unit in place within the tube 11.

The top end of the tube 8, in Figure 1, is open to the atmosphere through a hollow pipe fitting in the form of a reducing nipple 13 which is either threaded to the top end of the plug 3 or secured to the flange portion 4 thereof by any suitable means.

In Figures 4 and 5 we have shown an enlarged tank or boiler 14 within which are mounted a plurality of heating elements 8A in the same manner in which the heating element 8 is mounted within the tank 6 shown in Figure 1, that is to say, each heating unit 8A is secured by flanged plugs 3A bearing against a top end wall 5A of the tank 14 and the bottom ends of said heating units being secured by threaded plugs 9C to the bottom wall 2A of the tank 14. The top ends of the heating units 8A are open to the atmosphere through hollow pipe fittings 13A equivalent to the reducing nipples 13 shown in Figure 1.

The tank 6 in Figure 1 is provided at its lower end with an intake pipe 15 and at its upper end with an outlet pipe 16. Similarly the tank 14 is provided with an inlet 17 and an outlet 18.

In both forms of the invention the heating units are identical and each is so constructed that a cylindrical air space surrounds the tube 11 which is in concentric spaced relation to the tube or cylinder within which it is exposed. By this arrangement the heating units do not come into contact with the water to be heated within either tank in contrast to the commonly known "immersion" types of heating units. The lead or other material within the tube 11 and within which the heating element itself is imbedded melts into liquid form when heat is applied and thereby retains and radiates the heat for longer periods of time than heretofore possible with conventional immersion or other types of heating elements.

The hot water heating system shown diagrammatically in Figure 6 comprises a plurality of radiators 19 and 20 interconnected by an inlet pipe 21 and an outlet or return pipe 22. The pipe 21 is connected with an expansion tank 23 provided with any approved type of pressure gage 24 and said pipe 21 connects as at 25 with the top or outlet end of a tank or boiler made in accordance with our invention and indicated at 6 or 14. The outlet or return pipe 22 is connected in the conventional manner with the intake side of a water circulating pump 26 whose outlet is connected by pipe 27 with the intake end 28 of the tank or boiler 6 or 14. Water is supplied to the system through a water intake pipe 29 connected with a source of water supply and directed through a pressure reducing valve generally indicated at 30 to the pipe 27 between the pump and the tank or boiler. The top end of the tank or boiler is provided with a safety valve 31 to relieve excessive pressures within the tank or boiler in the conventional manner. An "Aquastat" indicated at 32 is associated with the feed pipe 21 to the radiators in the conventional manner and connected by wires 33 with the wires 12 of the heating element or elements as shown in Figure 1 or Figure 4. A thermostat (not shown) may be disposed in any key location and connected with an electric motor 34 to drive the pump 26 for circulating the heated water through the system to meet heat requirements.

While we have shown particular forms of embodiment of our invention, we are aware that many minor changes therein will readily suggest themselves to others skilled in the art without departing from the spirit and scope of the invention. Having thus described our invention, what we claim as new and desire to protect by Letters Patent is:

1. Electric water heating apparatus comprising in combination, a plurality of vertical tubes disposed within said tank, a heating unit disposed concentrically in each tube in spaced relation thereto to provide an annular air space between the heating unit and said tube, said heating unit comprising a tube closed at its bottom end by the base of a vertically disposed heating element, the opposite or upper end of each of said last mentioned tubes being open to the atmosphere, and said last mentioned tubes being filled with material adapted to be converted into a molten state in the presence of heat and entirely surrounding said heating element, whereby heat is transferred from each of said heating units through said air space to the water within said tank.

2. Electric water heating apparatus comprising in combination a cylindrical tank closed at both of its ends to contain a water supply therein, an inlet at the bottom end of the tank and an outlet at the opposite end thereof, a vertical tube disposed within said tank and sealed at both of its ends, a heating unit disposed concentrically within said tube in spaced relation thereto to provide an annular air space between the heating unit and said tube, said heating unit comprising a tube closed at its bottom end by the base of a vertically disposed heating element, the opposite or upper end of said last mentioned tube being open to the atmosphere, and said last mentioned tube being filled with material adapted to be converted into a molten state in the presence of heat and entirely surrounding said heating element, whereby heat is transferred from said heating unit through said air space to the water within said tank.

FREDERICK G. NETH.
JOHN F. TEMPLEMAN.

REFERENCES CITED

The following references are of record in the file of this patent:

UNITED STATES PATENTS

| Number | Name | Date |
| --- | --- | --- |
| 1,715,512 | Rochester | June 4, 1929 |
| 1,828,302 | Trane | Oct. 20, 1931 |
| 1,965,218 | Carr | July 3, 1934 |
| 2,048,104 | Clinefelter | July 21, 1936 |
| 2,066,127 | Slayter | Dec. 29, 1936 |
| 2,375,870 | Ray | May 15, 1945 |